United States Patent [19]

Huang

[11] Patent Number: 5,713,709

[45] Date of Patent: Feb. 3, 1998

[54] SCREW STAY SUITABLE FOR USE WITH SCREWS OF DIFFERENT SCREW HEADS

[76] Inventor: Shih Chang Huang, P.O. Box 82-144, Taipei, Taiwan

[21] Appl. No.: 669,967

[22] Filed: Jun. 25, 1996

[51] Int. Cl.⁶ .................................................. F16B 15/08
[52] U.S. Cl. ..................... 411/442; 411/966; 206/345; 206/347
[58] Field of Search .................... 411/442, 443, 411/444, 966; 206/345, 347

[56] References Cited

U.S. PATENT DOCUMENTS

| 5,509,768 | 4/1996 | Hon | 411/442 |
| 5,522,687 | 6/1996 | Chen | 411/442 X |

Primary Examiner—Neill R. Wilson
Attorney, Agent, or Firm—A & J

[57] ABSTRACT

A screw stay, injection-molded from plastics, including a longitudinal series of equally spaced screw mounting holes for mounting a respective screw, pairs of side notches made along two opposite long sides thereof between each two adjacent screw mounting holes, a plurality of annular flanges extending downwards from a bottom side thereof around each screw mounting hole, a plurality of splits extending from the top side through the border of each screw mounting hole into a part of each annular flange, sets of radial ribs respectively raised from the top side of the screw strap around each screw mounting hole and sloping outwardly upwards from each split for guiding the head of each screw into each screw mounting hole respectively, and sets of radial webs arranged under and aligned with respective ribs.

1 Claim, 6 Drawing Sheets

(12)

SCREW STAY SUITABLE FOR USE WITH SCREWS OF DIFFERENT SCREW HEADS

BACKGROUND OF THE INVENTION

1. Field of the Invention

This invention relates to an improved screw stay and in particular to one which is suitable for use with screws of different screw heads.

2. Description of the Prior Art

Conventionally, hand screwdrivers are commonly used to turn screws into workpieces. Nowadays, a variety of power drills have been developed for use to turn screws into workpieces. In order to match with the operation of a power drill in turning a series of screws into a workpiece, a screw stay is commonly used for holding screws in position. FIG. 1 shows a regular screw stay for this purpose. Referring to FIG. 2 and FIG. 1 again, the screw stay, referenced by B comprises a series of equally spaced screw mounting holes B1 for mounting a respective screw A, a plurality of annular flange B2 extended downwards from the bottom side around each screw mounting hole B1, and a plurality of splits B3 extended from the top side through the border of each screw mounting hole B1 into a part of each annular flange B2. This structure of screw stay is still not satisfactory in function. When screws A are turning through the screw mounting hole B into the workpiece, the flat screw stay B will be forced to deform, causing the screws A tilted. Because the screw stay B is injection-molded from plastics and the size of the splits B3 is tiny, the splits B3 may not be formed on the screw stay B when the screw stay B is molded, causing the operator unable to turn screws A into the countersunk screw mounting holes B1 and the annular flanges B2. Furthermore, when the shank of one screw A is turned into one screw mounting hole B1, the cone between the upper surface of the screw head A1 and the shank of the screw A can then be driven into the screw mounting hole B to stretch open the splits B and the annular flange B2, so that the screw A can be completely driven into the workpiece. However, if a screw bolt or any of other types of screws which do not have a cone between the top surface and the shank is used, the head of the screw bolt or screw cannot be driven into the screw mounting hole B1. Therefore, the application of this structure of screw stay is limited.

Therefore, it is an object of the present invention to provide an improved screw stay which can obviate and mitigate the above-mentioned drawbacks.

SUMMARY OF THE INVENTION

This invention is related to an improved screw stay.

It is therefore one object of the present invention to provide a screw stay which holds screws in position when they are turning into the workpiece. It is another object of the present invention to provide a screw stay which is suitable for holding screws of any of a variety of heads. These objects are achieved by making a plurality of radial ribs on the screw stray around each screw mounting hole, permitting the radial ribs to be outwardly upwards extended from each split around each screw mounting hole. Therefore, each set of radial ribs define a substantially tapered guide hole for guiding the head of the respective screw into position.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
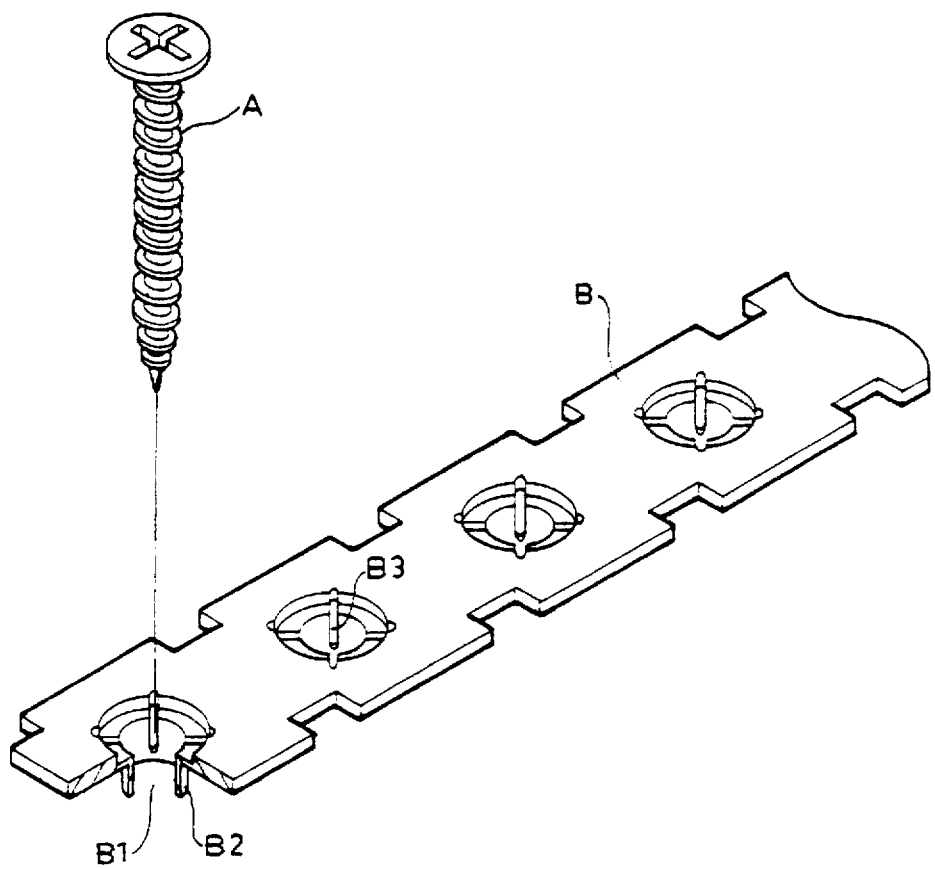
FIG. 1 is an elevational view of a screw stay according to the prior art.
Figure 2:
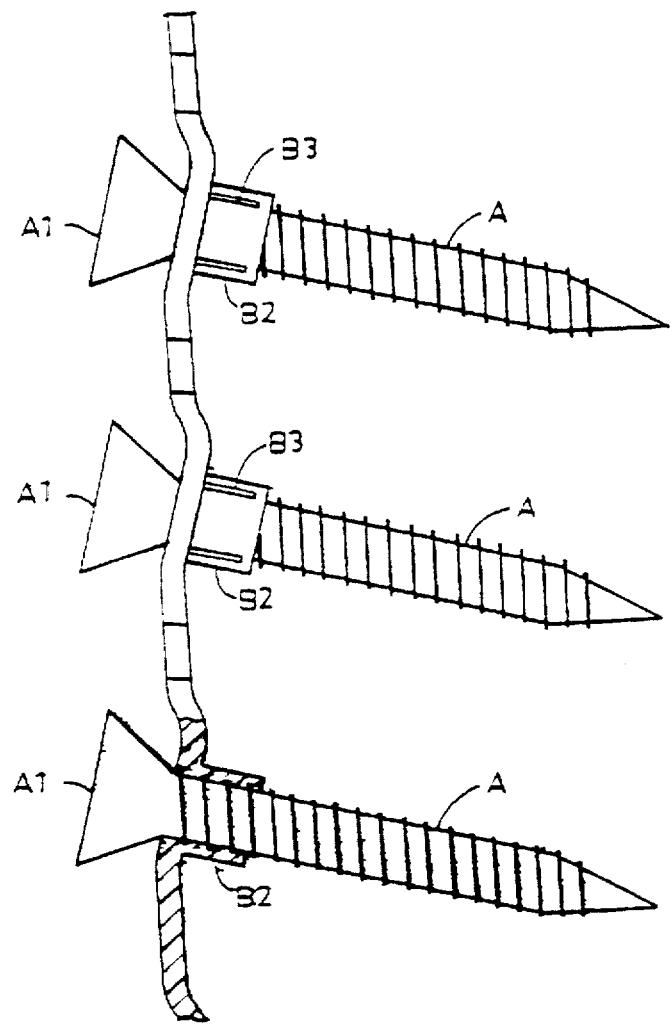
FIG. 2 is a side plain showing screws driven into the screw stay of FIG. 1 and the screw stay deformed.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 3:
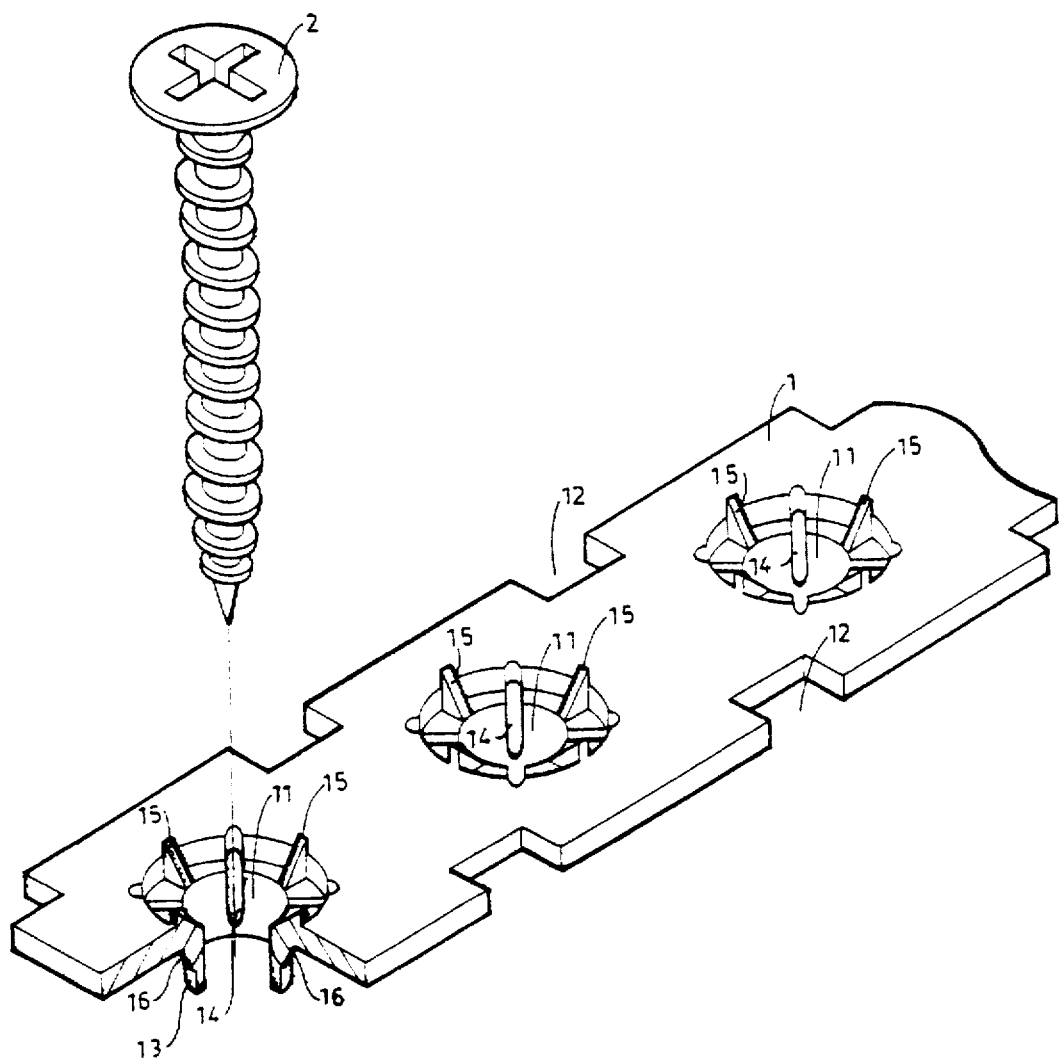
FIG. 3 is an elevational view of a screw stay according to the present invention.
Figure 4:
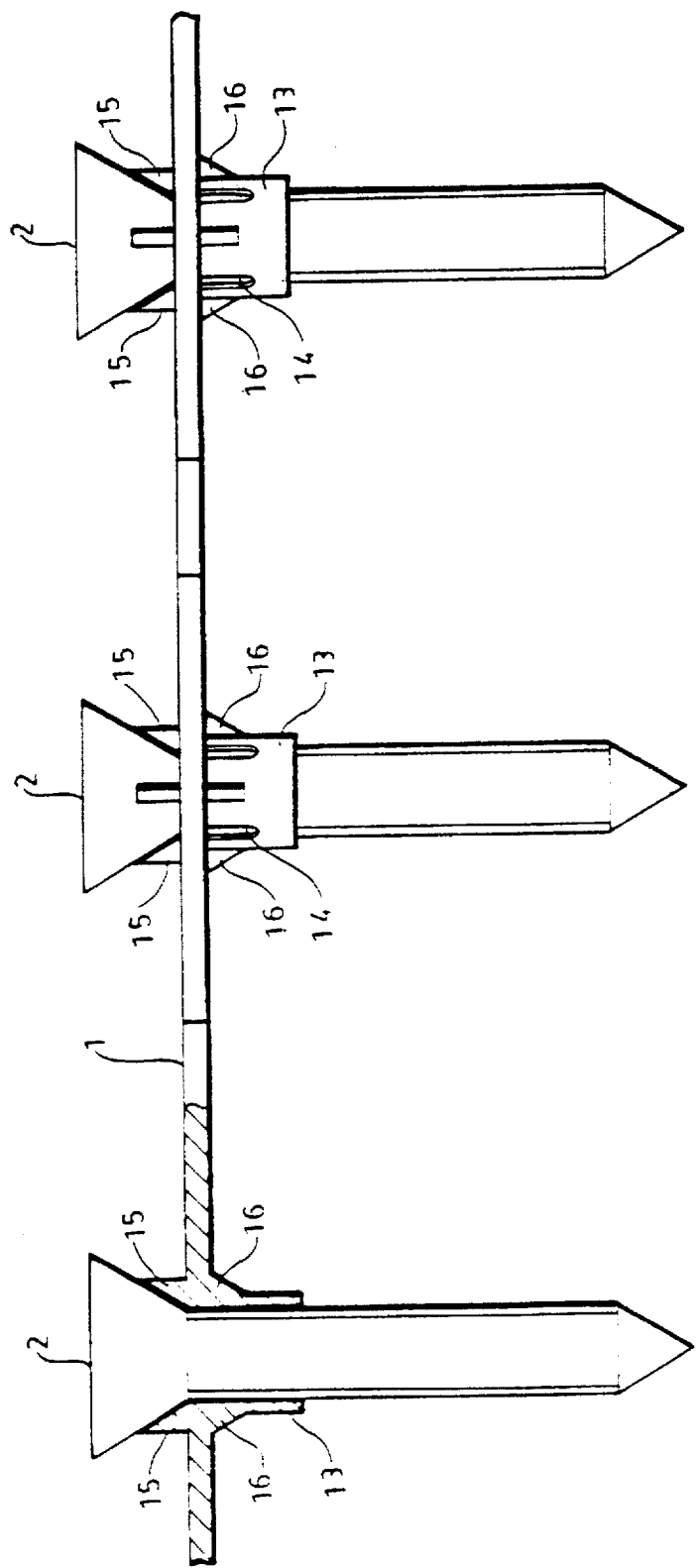
FIG. 4 is a side plain view showing screws respectively driven into the respective screw mounting holes on the screw stay shown in FIG. 3.

Referring to FIGS. 3 and 4, the screw stay, referenced by 1, is an elongated, flat strap injection-molded from plastics, comprising a longitudinal series of equally spaced screw mounting holes 11 for mounting a respective screw 2, pairs of side notches 12 made along the two opposite long sides thereof between each two adjacent screw mounting holes 11, a plurality of annular flanges 13 extending downwards from the bottom side thereof around each screw mounting hole 11, a plurality of splits 14 extending from the top side thereof through the border of each screw mounting hole 11 into a part of each annular flange 13, and sets of radial ribs 15 each arranged between two splits 14 and respectively raised from the top side around each screw mounting hole 11 and sloping outwardly upwards from each split 14, and sets of radial webs 16 arranged under and aligned with respective ribs 15. Each set of radial ribs 15 define a substantially tapered guide hole for guiding the head 21 of a respective screw 2 into position. The webs 16 are integrally formed with the annular flanges 13.

Referring to FIG. 4 and FIG. 3 again, when screws 2 are respectively driven into the screw mounting holes 11 and the workpiece (not shown), the upper part of the shank of each screw 2 is firmly retained by the annular flanges 13 reinforced by the webs 16, and the head 21 of each screw 2 is firmly supported on the respective set of radial ribs 15; therefore the screws 2 will not be tilted when they are driven into the workpiece.

Figure 5:
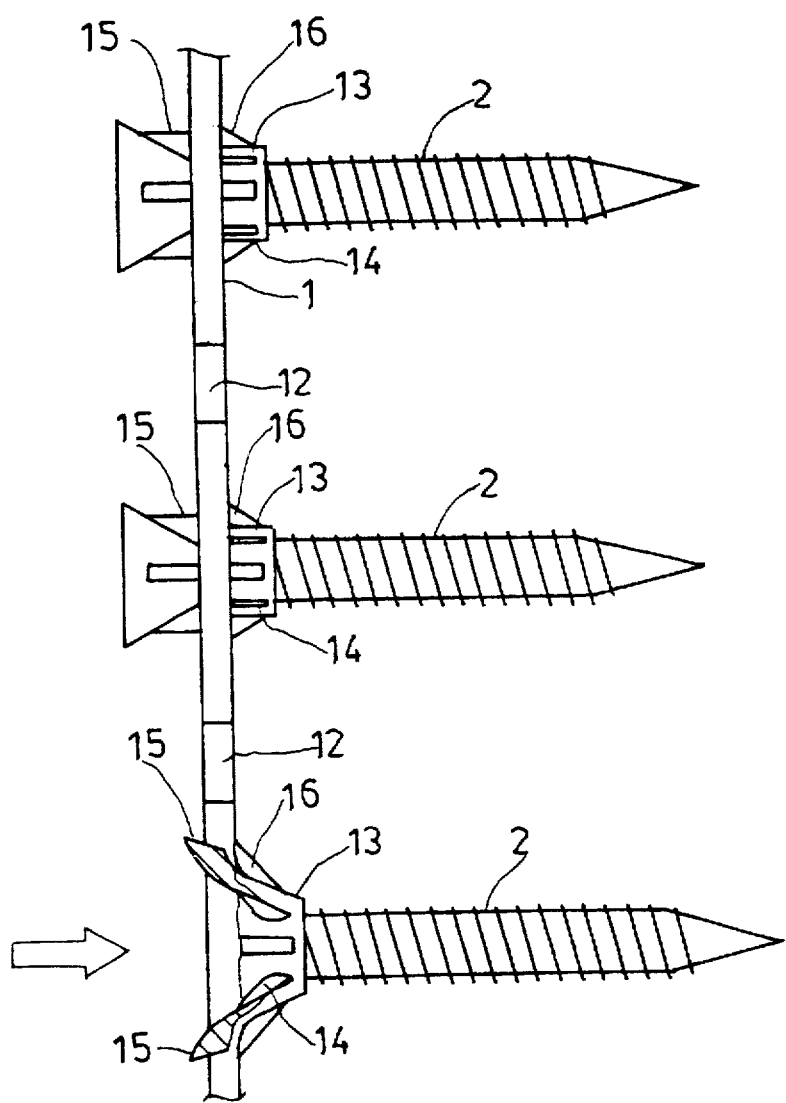
FIG. 5 is similar to FIG. 4 but showing the head of the first screw driven into the respective screw mounting hole on the screw stay.

Referring to FIG. 5, when the shank of one screw 2 is completely driven into the respective screw mounting hole 11, the head 21 of the screw 2 is guided into position by the respective set of radial ribs 15, causing the respective annular flange 13 stretched open for letting the bottom end Of the head 21 of the screw 2 be driven into position. Therefore, the heads 21 of the screws 2 can be easily driven into position even if the splits 15 are not well formed on the screw stay 1.

Figure 7:
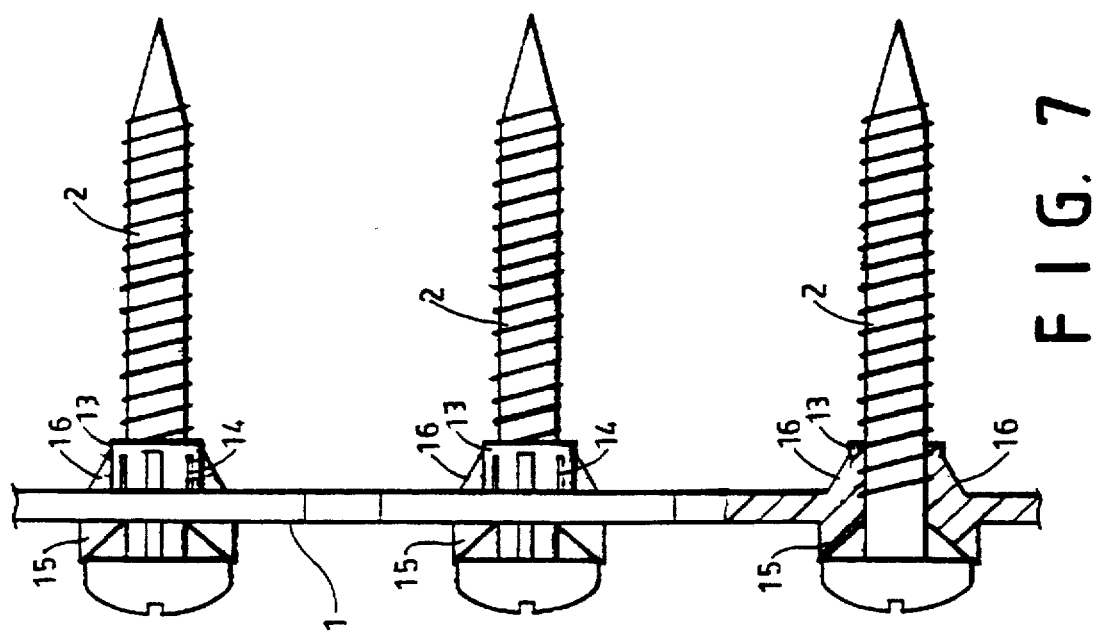
FIG. 7 is still another applied view of the present invention, showing screws of another different head mounted.
Figure 6:
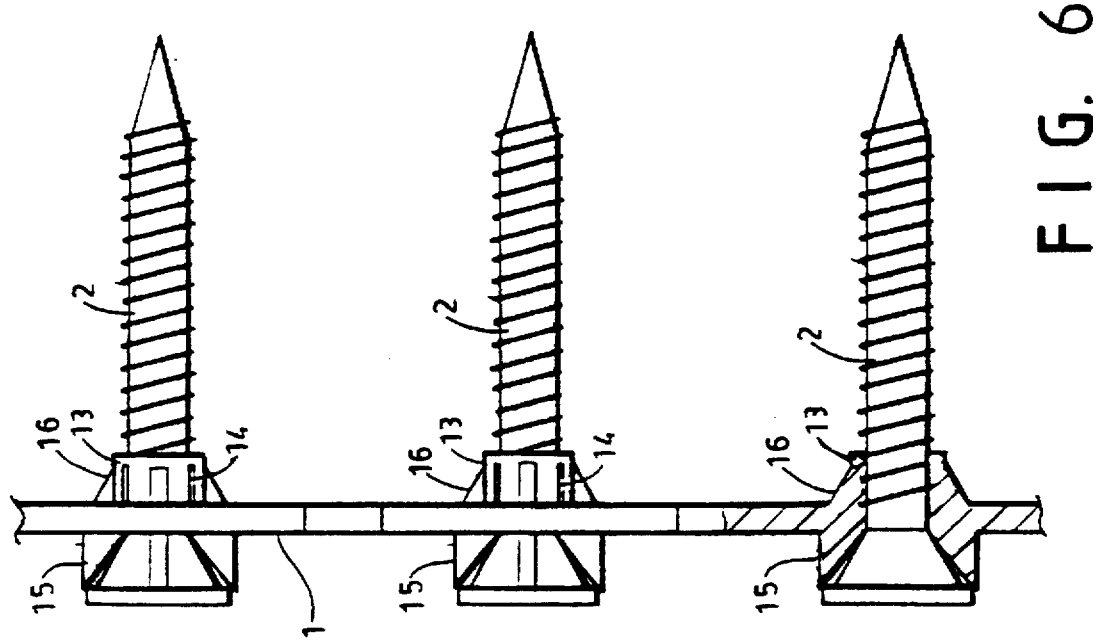
FIG. 6 is another applied view of the present invention, showing screws of a different head mounted.

Referring to FIGS. 6 and 7, by means of the guide of the sets of radial ribs 15, screws 2 of different heads can still be easily driven into position.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A screw stay, injection-molded from plastics and having an elongated strap portion, comprising a longitudinal series of equally spaced screw mounting holes for mounting a respective screw, pairs of side notches made along two opposite long sides of said elongated strap portion between each two adjacent screw mounting holes, a plurality of annular flanges extending downwards from a bottom side of said elongated strap portion around each screw mounting hole to form cylindrical protrusions, a plurality of splits extending from the top side through the border of each screw mounting hole into a part of each annular flange, sets of radial ribs respectively raised from the top side of the screw strap around each screw mounting hole and sloping outwardly upwards for guiding the head of each screw into each screw mounting hole respectively, and sets of radial webs arranged under the strap and aligned with respective ribs, each of said radial ribs defining a substantially tapered guide hole for guiding a head of a repsective screw into position, said webs being integrally formed with said annular flanges.

\* \* \* \* \*